US008695655B2

(12) United States Patent
Cuny et al.

(10) Patent No.: US 8,695,655 B2
(45) Date of Patent: Apr. 15, 2014

(54) TIRE TREAD WITH TREAD WEAR INDICATOR

(75) Inventors: Andre Cuny, Habay-la-Neuve (BE); Peter Johann Cornelius Maus, Bullingen (BE)

(73) Assignee: The Goodyear Tire & Rubber Company, Akron, OH (US)

(*) Notice: Subject to any disclaimer, the term of this patent is extended or adjusted under 35 U.S.C. 154(b) by 1478 days.

(21) Appl. No.: 11/872,316

(22) Filed: Oct. 15, 2007

(65) Prior Publication Data

US 2009/0095388 A1    Apr. 16, 2009

(51) Int. Cl.
*B60C 11/24*    (2006.01)

(52) U.S. Cl.
USPC .............. 152/154.2; 152/209.15; 152/209.17; 152/209.21; 152/DIG. 3

(58) Field of Classification Search
USPC .............. 152/154.2, 209.15, 209.17, 209.18, 152/209.21, 209, 28, DIG. 3
See application file for complete search history.

(56) References Cited

U.S. PATENT DOCUMENTS

| | | | |
|---|---|---|---|
| 2,706,509 A | | 4/1955 | White |
| 3,653,422 A | * | 4/1972 | French ........................ 152/154.2 |
| 4,226,274 A | | 10/1980 | Awaya et al. |
| 6,423,586 B1 | | 7/2002 | Yamazaki et al. |
| 6,523,586 B1 | * | 2/2003 | Eromaki et al. ........... 152/154.2 |
| 6,983,777 B2 | | 1/2006 | Ratliff, Jr. |
| 7,011,126 B2 | | 3/2006 | Heinen |
| 7,028,733 B2 | | 4/2006 | Ratliff, Jr. |
| 7,143,798 B2 | * | 12/2006 | Ratliff, Jr. ................. 152/209.28 |
| 7,249,620 B2 | | 7/2007 | Croissant et al. |
| 2002/0036039 A1 | | 3/2002 | Shimura |
| 2004/0256041 A1 | * | 12/2004 | Ratliff, Jr. ................. 152/209.18 |
| 2006/0037683 A1 | * | 2/2006 | Cuny et al. .................. 152/154.2 |
| 2006/0213594 A1 | * | 9/2006 | Kemp et al. ................. 152/154.2 |
| 2007/0056665 A1 | | 3/2007 | Parmentier |
| 2007/0163691 A1 | | 7/2007 | Cuny et al. |

FOREIGN PATENT DOCUMENTS

| | | | |
|---|---|---|---|
| DE | 3627832 | * | 2/1988 |
| DE | 3627833 | | 2/1988 |
| DE | 3627832 | | 2/2009 |
| EP | 1066991 | | 1/2001 |
| EP | 1506884 | * | 2/2005 |
| EP | 1524131 | | 4/2005 |
| EP | 1705034 | | 9/2006 |
| FR | 797713 | | 5/1936 |
| FR | 1480472 | | 5/1967 |
| FR | 1498340 | * | 9/1967 |

(Continued)

OTHER PUBLICATIONS

Machine translation for Europe 1,506,884 ( no date).*

(Continued)

*Primary Examiner* — Steven D Maki
(74) *Attorney, Agent, or Firm* — David L King

(57) ABSTRACT

A tire tread 2 for a vehicle tire has a plurality of tread elements 10 extending radially outwardly from a tread base 24 to a radially outer surface. Each tread element 10 is defined by adjacent grooves 12, 14. The tread 2 has at least one tread element 10 projecting from the tread base 24 and having one or more tread wear indicators TWI 20. Each TWI 20 is located at the intersection of two grooves 12, 14 adjacent or integral to the at least one tread element 10.

6 Claims, 6 Drawing Sheets

(56) References Cited

FOREIGN PATENT DOCUMENTS

| | | | |
|---|---|---|---|
| JP | 11-263103 | * | 9/1999 |
| JP | 2006-051844 | * | 2/2006 |
| WO | 2007102790 | | 9/2007 |

OTHER PUBLICATIONS

Machine translation for Japan 11-263103 (no date).*
Mahine translation for German 3,627,832 (no date).*
Machine translation for Japan 2006-051844 (no date).*
Machine translation for France 1,498,340 (no date).*

* cited by examiner

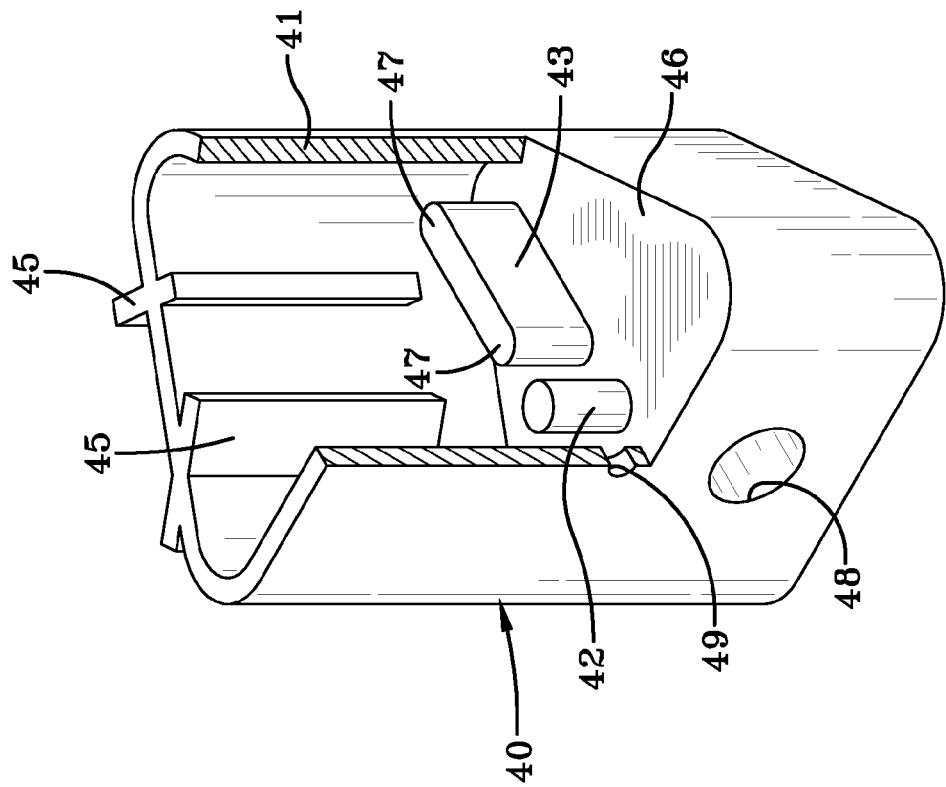
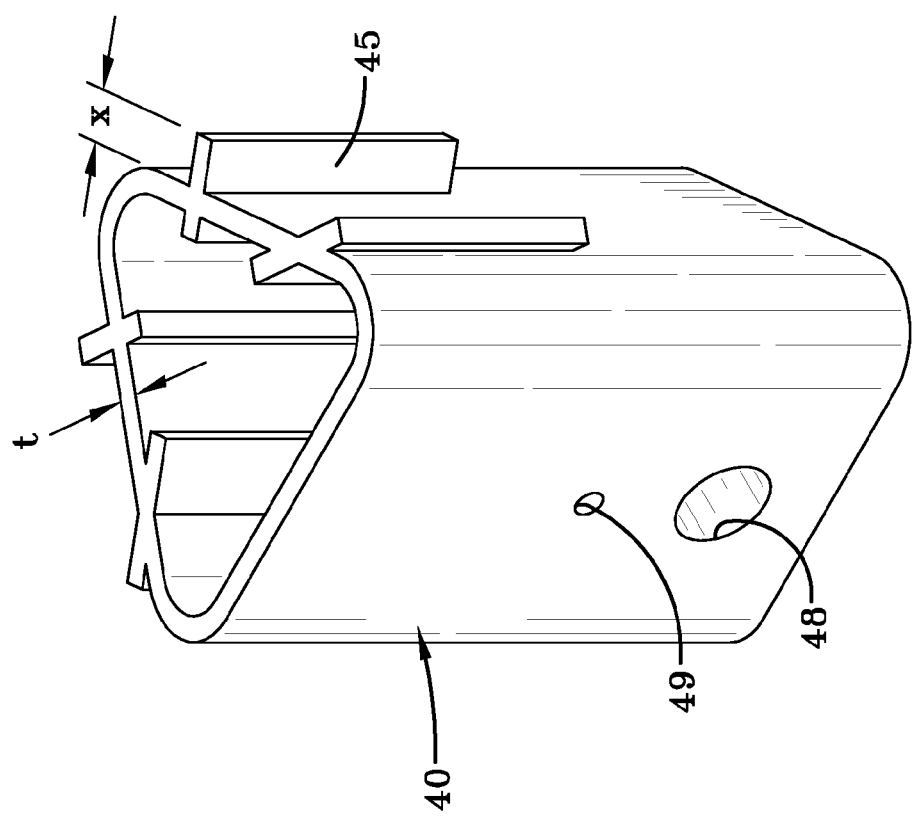

TIRE TREAD WITH TREAD WEAR INDICATOR

FIELD OF THE INVENTION

The present invention relates to the tire tread generally, more particularly to tread having visually observable tread wear indicators.

BACKGROUND OF THE INVENTION

The use of tread wear indicators is not new and in fact is mandated by vehicle safety laws in many countries. As the tire tread wears away the ability to maintain traction diminishes in wet or snow covered roads. Accordingly once the tread is worn beyond a certain tread depth the groove voids become sufficiently small that the tire should be replaced to maintain adequate traction.

One of the most common ways to provide an indication of tread wear is to provide a plurality of humps molded in the base of circumferential grooves. These humps extend across the groove to each opposing groove wall. Historically these TWI's (tread wear indicators) were aligned in rows circumferentially positioned in 4 or more locations around the tire and extended above the tread groove bottom an amount equal to the depth mandated for tire removal. These small humps provided little impedance to water drainage when the tire was new and the cross sectional area of the groove void was large, however, by their very design as the tread depth was reduced by wear these tread wear indicators locally blocked off an increasing percentage of the groove until they actually dammed the void at the fully worn depth. In hindsight this orientation and the location of the TWI hump style indicator was flawed. A second aspect and even potentially more important problem with such indicators was the inability to visually see these small humps. As early as the 1950's in U.S. Pat. No. 2,706,509 there was proposed providing a much larger multi-step surfaces extending in a large curved arc from one groove wall of a tread rib into the adjacent circumferential groove or in a series of steps extending stacked in the circumferential direction. These multi-step surfaces provided a visually more observable tread wear indication, but also occupied an even larger percentage of the circumferential grooves void volume making this idea as bad if not even more problematic in wet roadways.

A superior approach is shown in DE3627833 wherein the tread wear indicator is shown as a slot molded in one wall of the tread ribs along a circumferential groove. This avoids blocking the groove void volume, but unfortunately appears very similar to any other groove void, meaning the person must understand that when that TWI void is worn away or disappears, it is time to replace the tire. Since this is unlikely this form of disappearing TWI is of little practical value.

A whole host of manufacturers have attempted to provide improved visual contrast between the tread and the worn level or TWI, as shown in FR1480472, FR797713 and U.S. Pat. No. 4,226,274. These patents disclosed color enhanced indications. While visually observable this greatly increase the complexity and cost of manufacture not to mention tends to locally degrade the tread compound uniformity that can lead to localized uneven tread wear.

Ideally the tread wear indicator should be located in an area so as not to interfere with or restrict the groove void area. Several designs have attempted to embed the tread wear indicators in either a tread rib or a tread block element. U.S. Pat. No. 6,423,586 provided a plurality of depth numbers 2 through 8 molded in the tread depth in mm such that the number extended into the tread depth to a distance above the groove full depth representing that depth and as the tread wore out the larger numbers vanished in order until only the 2 mm number remained.

U.S. Pat. No. 7,011,126 provided a similar feature having a series of voids molded in the sidewall of a rib each void having a number molded into it and the void was only exposed as the top surface of the tread wore down.

US 2006/0213594 and US 2002/0036039 each shows TWI's embedded in a tread element, as does US 2006/0037683 of the inventor of this invention. Each of these inventions rely on a changing TWI shape or design pattern within the tread element to indicate a wear condition of the tread.

The primary problem with each of these solutions is the visual appearance of the wear indicator is not readily apparent in terms of contrasting appearance from the rest of the tread. Furthermore, the TWI itself while not interfering with the groove void volume, does introduce a local physical properties change to the working structure of the tread element.

Ideally, the wear condition of the tire should be accomplished with little or no effect on the groove void volume or the working surfaces of the tread.

The invention disclosed herein provides a novel way to inform the user of the tread depth without appreciably decreasing any groove void volume, particularly the circumferentially extending groove volumes of a tire tread. The design concept, as taught herein further is positioned to draw the observer's eyes to the tread wear indicators in an easily seen fashion in all conditions of wear from new to fully worn, a feature sorely lacking in the prior art.

SUMMARY OF THE INVENTION

A tire tread for a vehicle tire has a plurality of tread elements extending radially outwardly from a tread base to a radially outer surface. Each tread element is defined by adjacent grooves. The tread has at least one tread element projecting from the tread base and having one or more tread wear indicators. Each TWI is located at the intersection of two grooves adjacent or integral to the at least one tread element. Each TWI forms a corner or end of the at least one tread element and has a reduced depth relative to the radially outer surface of the tread element. The TWI forms a substantially triangular shaped plateau extending above the tread base from two sides of the tread element. The at least one tread element has a chamfered groove wall extending radially inward to the TWI. Preferably the groove wall has a plurality of steps located at different tread depths. These steps can be used to provide an indication of the level of tread remaining on the tire. The tread further has a plurality of generally circumferentially extending grooves and each generally circumferentially extending groove is adjacent the at least one tread element with a TWI. A pair of generally laterally extending grooves intersects one or more generally circumferentially extending grooves to define the outer boundary or perimeter shape of the tread element having at least one TWI.

Preferably the at least one tread element has two TWI located at diagonally opposite corners adjacent the intersection of a lateral groove and a circumferentially extending groove defining the shape of the tread element. In this way the TWI are at the intersections of a forward lateral groove and a rear facing lateral groove each intersecting a different circumferential groove.

In another embodiment, the tread has circumferentially extending grooves which include a plurality of circumferentially extending slanted grooves extending from the central region of the tread outwardly towards a lateral edge and the at least one tread element has the TWI in an end at the intersection of two generally circumferentially extending grooves, at least one being a slanted groove and optionally one being a generally continuous circumferential groove. As used in here in any of the embodiments, a laterally circumferentially extending grooves can be straight, curved, zig-zag, arched or of any particular shape desired to define a particular tread element within the tread. It is important, however, that the TWI on the at least one tread element within the tread be at a corner or end of a tread element such that it is visually observable at all times. Preferably the TWI may have an outer layer with a particular recessed pattern molded into the tread wear indicator which can as it is worn exposes a second profile geometric shape which alerts the user that the tire is in the totally worn condition.

DEFINITIONS

The following definitions are applicable to the present invention.

"Groove" means an elongated void area in a tread that may extend circumferentially or laterally about the tread in a straight curved, or zigzag manner. Circumferentially and laterally extending grooves sometimes have common portions and may be sub classified as "wide", "narrow", or "sipe". The slot typically is formed by steel blades inserted into a cast or machined mold or tread ring therefore. In the appended drawings, slots are illustrated by single lines because they are so narrow. A "sipe" is a groove having a width in the range from about 0.2% to 0.8% of the compensated tread width, whereas a "narrow groove" has a width in the range from about 0.8% to 3% of the compensated tread width and a "wide groove" has a width greater than 3% thereof. The "groove width" is equal to tread surface area occupied by a groove or groove portion, the width of which is in question, divided by the length of such groove or groove portion; thus, the groove width is its average width over its length. Grooves, as well as other voids, reduce the stiffness of tread regions in which they are located. Sipes often are used for this purpose, as are laterally extending narrow or wide grooves. Grooves may be of varying depths in a tire. The depth of a groove may vary around the circumference of the tread, or the depth of one groove may be constant but vary from the depth of another groove in the tire. If such narrow or wide groove is of substantially reduced depth as compared to wide circumferential grooves which they interconnect, they are regarded as forming "tie bars" tending to maintain a rib-like character in the tread region involved.

"Inner" means toward the inside of the tire and "outer" means toward its exterior.

"Outer" means toward the tire's exterior.

"Radial" and "radially" are used to mean directions radially toward or away from the axis of rotation of the tire.

"Tread" means a molded rubber component which, when bonded to a tire casing, includes that portion of the tire that comes into contact with the road when the tire is normally inflated and under normal load. The tread has a depth conventionally measured from the tread surface to the bottom of the deepest groove of the tire.

BRIEF DESCRIPTION OF THE DRAWINGS

The invention will be described by way of example and with reference to the accompanying drawings in which:

FIG. 8 shows a perspective view of an exemplary blade that can be used to form the tread wear indicator of the present invention.

FIG. 8A is a second perspective view of the blade of FIG. 8 with portions removed to enable viewing of the internal feature of the tread wear indicator blade made according to the present invention.

DETAILED DESCRIPTION OF THE INVENTION

Figure 1:
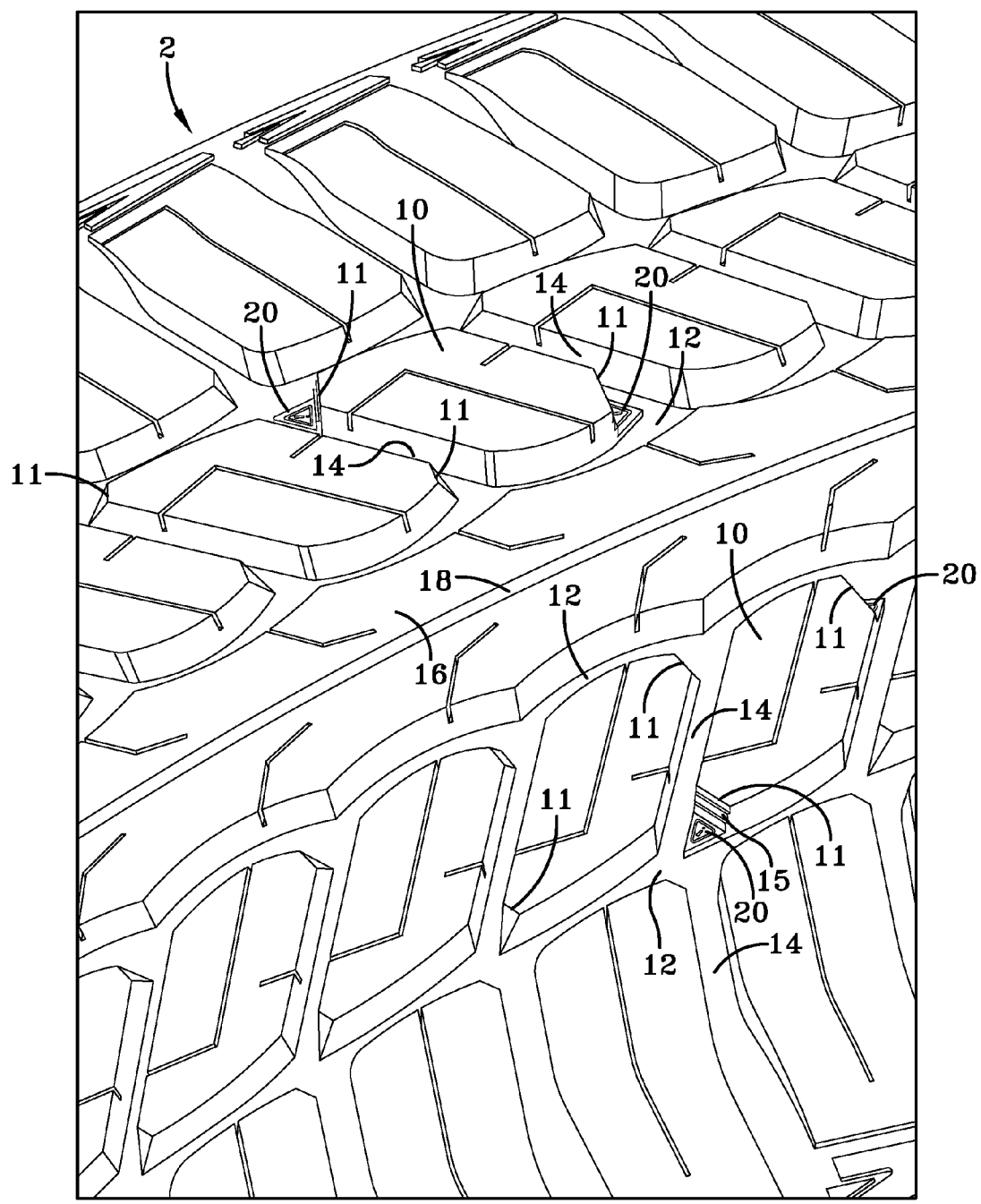
FIG. 1 is a portion of a tire tread according to the present invention.

The following language is of the best presently contemplated mode or modes of carrying out the invention. This description is made for the purpose of illustrating the general principles of the invention and should not be taken in a limiting sense. The scope of the invention is best determined by reference to the appended claims. The reference numerals as depicted in the drawings are the same as those referred to in the specification. For purposes of this application, the various embodiments illustrated in the figures each use the same reference numeral for similar components. The structures employed basically the same components with variations in location or quantity thereby giving rise to the alternative constructions in which the inventive concept can be practiced.

FIG. 1 illustrates a portion of a tire tread 2. The tire tread 2 has a plurality of blocks or tread elements 10 defined by circumferential and lateral grooves 12, 14 and a central rib 16 separated by a narrow circumferentially continuous groove 18. The exact configuration of the tread 2 is irrelevant to the present invention and any tread configuration may be employed.

Located in at least one of the tread elements 10, is one or more tread wear indicators 20. The tread wear indicator 20 is located in the tread in such a manner such that it is recessed and has a depth lower than the tread's outer surface as the tire rotates when the tire is new and unworn. While the illustrated tread wear indicators 20 are present along diagonally opposite corners of the tread element 10 as illustrated in FIG. 1, it is important to note that the tread elements 10 may employ one or more of these tread wear indicators 20 if so desired depending on the tread pattern or configuration as most suitable for the particular tire.

Figure 2:
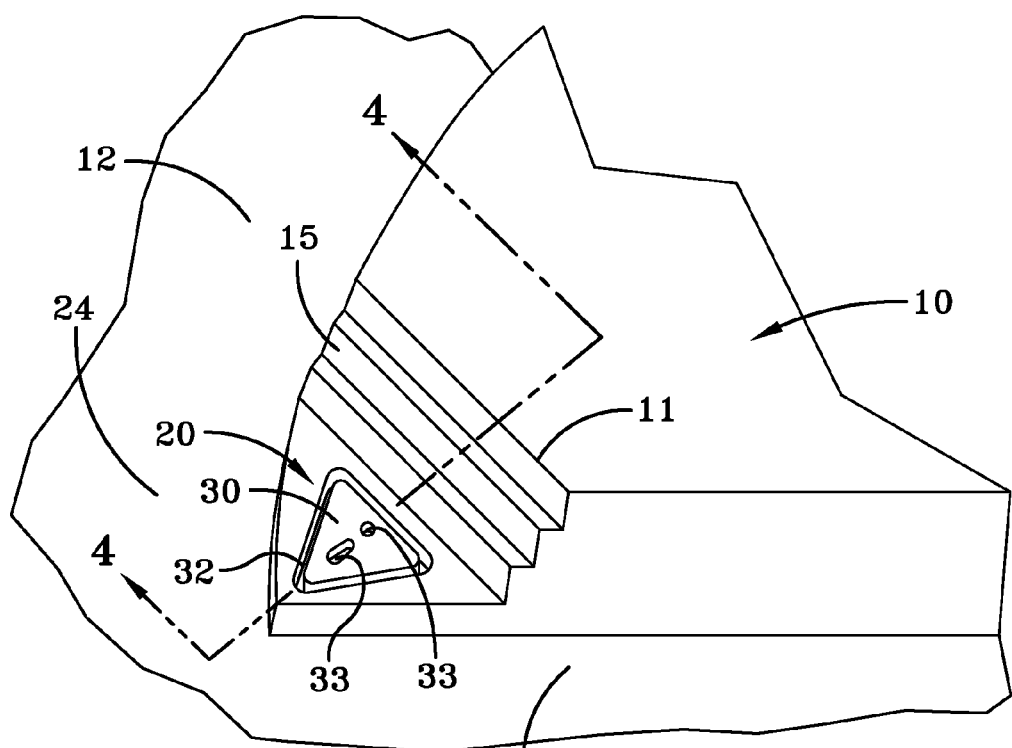
FIG. 2 is an enlarged view of a tread element having a tread wear indicator according to the present invention wherein the tread is in the new or unworn condition.

As illustrated in FIGS. 1 and 2 the tread wear indicators 20 extend along and are continuations of two sides or groove walls of the tread element 10 and are positioned such that they are located within an intersection of a circumferentially extending groove 12 and a laterally extending groove 14 as shown. As such the tread wear indicator 20 takes on a substantially triangular shape as shown.

With reference to FIG. 2, an enlarged portion of the tread element 10 is illustrated. The circumferential groove 12 as shown is slightly curved and therefore the outer edge of the tread wear indicator 20, hereinafter also referred to as TWI 20, is shown with a slight curvature. The lateral groove 14 as illustrated is substantially straight and therefore that portion of the triangular shaped TWI 20 is straight, in this fashion there is no visual interruption of the tread pattern appearance per se, however, because the TWI 20 extends from the tread base 24 to a reduced depth the observer can readily see at all times the TWI 20 particularly on the new tread 2. Furthermore, as shown in FIG. 1, virtually each block element had a chamfer on diagonally opposite corners 11. These chamfers are used to help reduce irregular wear and sharp edges within the tread element 10. By taking advantage of this feature, a reduced TWI 20 can be positioned in this location and as such similar to an inclined chamfer tends to enhance the rigidity of the tread 2, the base 21 of the triangular shape TWI 20 adjacent or as shown integral to the at least one tread element 10 as it extends radially outward shows a staircase or multi-step 24 shape providing different levels of depth as the tread element 10 extends radially outwardly towards the outer surface of the tread 2. These steps 15 extend toward the outer surface and as illustrated, provide additional structural rigidity at the corners 11.

Figure 6B:
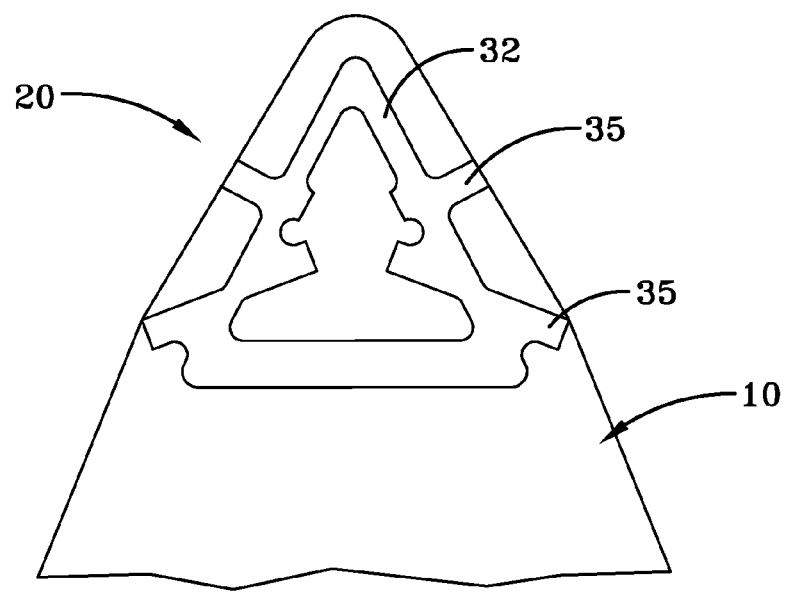
FIG. 6B shows the symbol used for the tread wear indicator in the fully worn condition.

With reference to FIGS. 2 and 6B the outer surface of the triangular shaped TWI 20 is shown a symbol or geometric profile 30 which also represents substantially triangularly shaped recess 32 formed and molded into the tread wear indicator. This recess 32 has the outline of a triangle as shown and within the center of the triangular outline is an exclamation point 33 molded into the indicator 20. This shape is to alert the user that this is a TWI and should be visually used. This can be easily communicated to the purchaser of the tire upon purchase and as such he or she will know to look for this as an indication of wear in the future as the tire wears.

Figure 3:
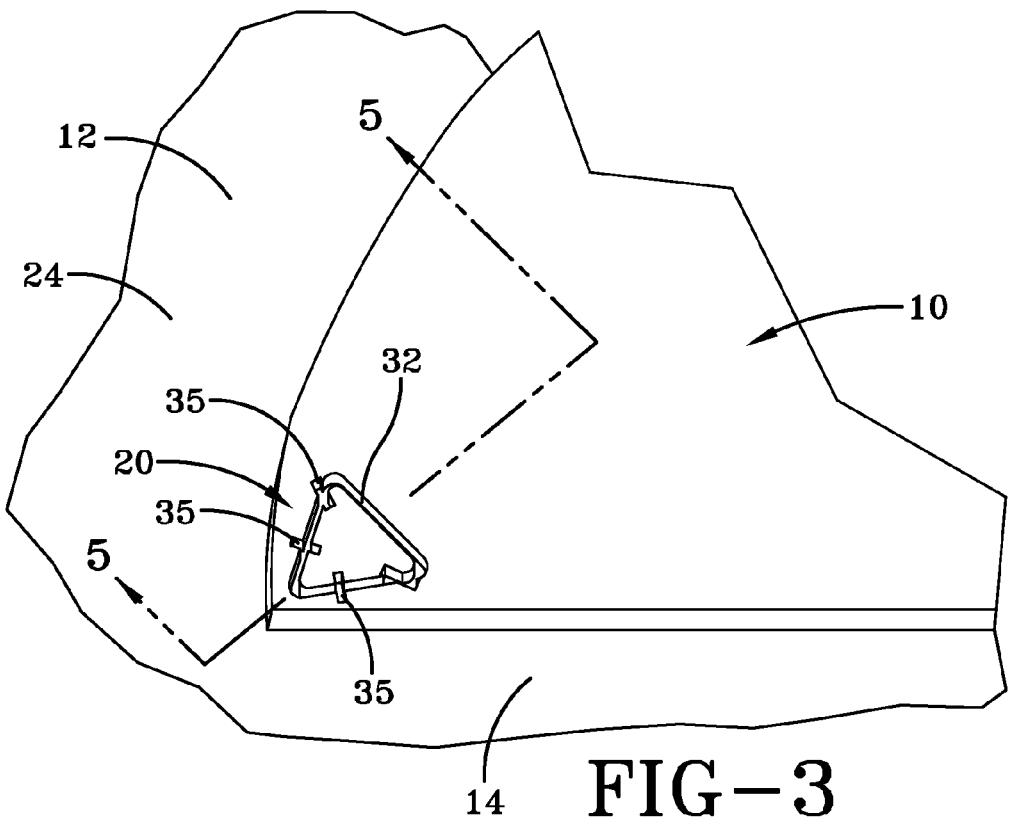
FIG. 3 is a view of the tread of FIG. 2 in a fully worn condition.

With reference to FIGS. 3 and 6B, as the tread wears the steps of the outer surfaces along the walls of the tread element are abraded away as is the outer surface of the TWI as this occurs a new geometric shape emerges. The exclamation point 33 of the TWI 20 is abraded away and an underlying geometric profile 34 is exposed showing the triangular shape 32 with a plurality of short lines 35 crossing the triangle 32 indicating that the tread 2 is in the fully worn position. These geometric shapes can be easily molded into the tire tread 2 and are part of the tire mold. In this fashion when producing the tire, these TWI's 20 are formed.

Figure 4:
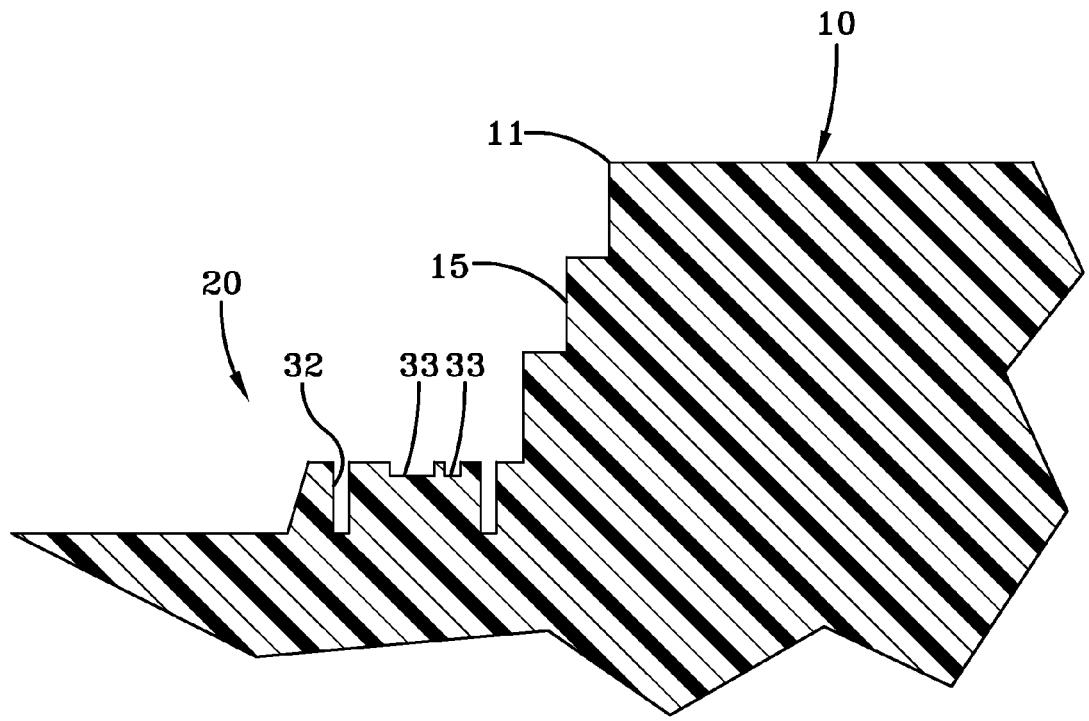
FIG. 4 is a cross sectional view of the tread wear indicator in the new condition and showing a portion the tread element.
Figure 6A:
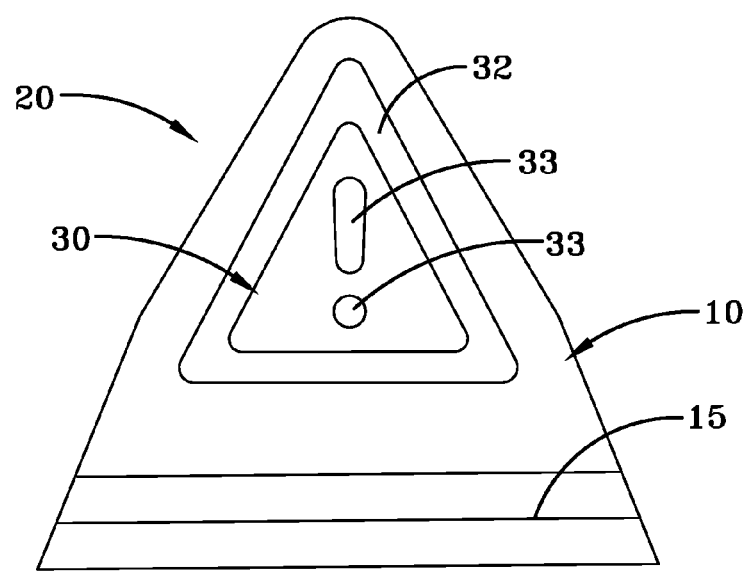
FIG. 6A shows the symbol used for the tire tread wear indicator according to the present invention prior to being worn.
Figure 5:
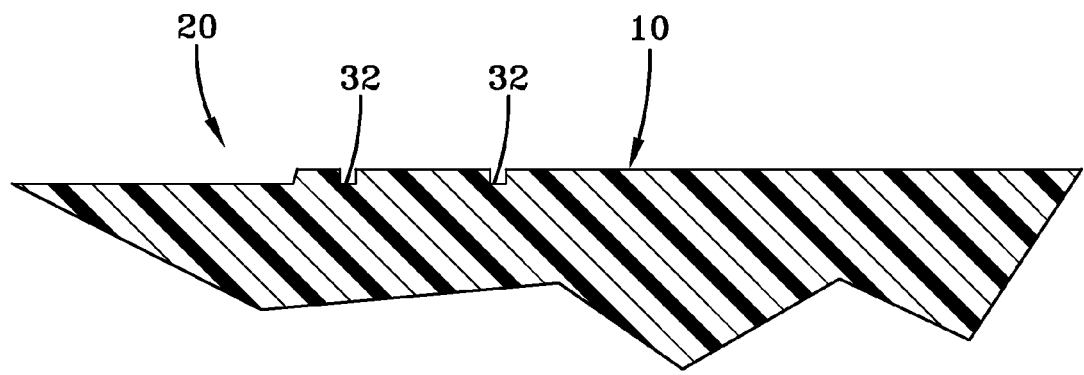
FIG. 5 is a cross sectional view of the tread wear indicator in the fully worn condition.

FIGS. 4 and 5 demonstrate the geometric shape 30, 34 and of the large triangular outline 32 with the exclamation point 33 as shown in cross section and in FIG. 5 the fully worn geometric shape. While these shapes are easily identifiable in the tread 2 according to the present invention, it is important to note that the tread elements 10 need not be limited to rectangular or short polygonal shapes, but could include other geometric tread shapes.

Figure 7:
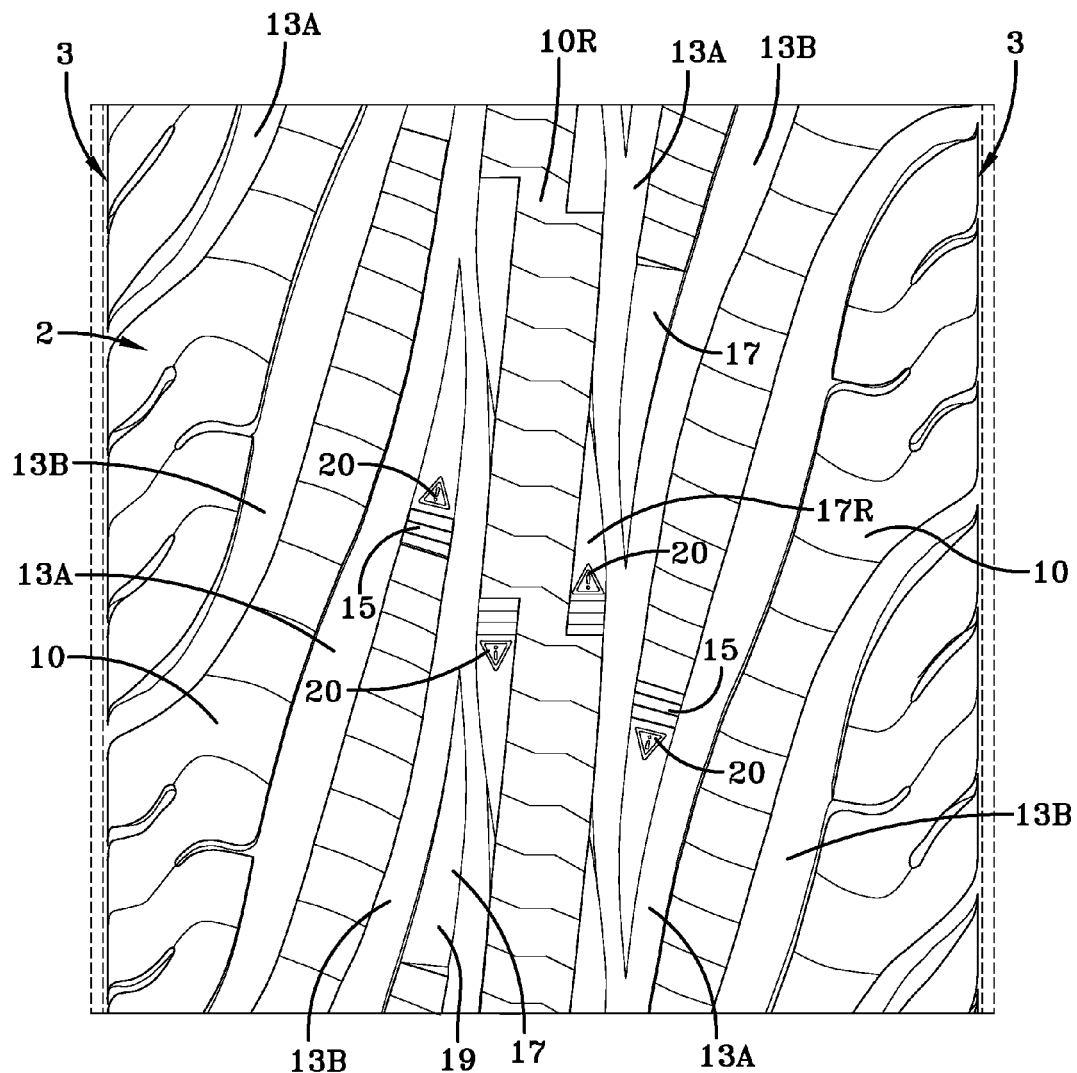
FIG. 7 is a portion of a tread according to an alternative embodiment of the present invention.

For example, with reference to FIG. 7 an alternative embodiment is shown wherein the tread 2 has a plurality of inclined grooves 13A, 13B. The inclined grooves 13A, 13B extend from the central region of the tread 2 branching or curving into generally laterally extending groove portions to the lateral edges 3. On each side of the tread, the inclined grooves 13A, 13B are connected to each other at the central region to form a circumferential groove. The tread elements 10 are defined by these grooves and are shaped like elongated rib like structures, as illustrated these tread elements 10 having large elongated reduced chamfers 17 at ends 19 submerged between the intersections of these two inclined grooves 13A, 13B. As such, within these ends 19 the TWI 20 according to the present invention can easily be positioned such that the TWI 20 is provided on these rib like tread elements 10. Similarly as shown in the central region of the tread 2 according to the alternative embodiment is a continuous tread rib 10R also having reduced chamfered surfaces 17R adjacent sides of the rib 10R. The rib 10R is located between the circumferential grooves formed by the inclined grooves 13A, 13B. These chamfered surfaces 17R correspond to an opposite chamfer 17 of a tread element 10 as illustrated and are aligned substantially adjacently. As shown, it is possible therefore to insert the TWI 20 according to the present invention in this location as well. In this case the TWI 20 is formed as a sidewall portion of the rib 10R and adjacent that tread element 10 at the intersection of two grooves 13A, 13B, but not positioned between each of those intersecting grooves 13A, 13B so as to form a corner 11 or an end 19 of a tread element 10, but nevertheless is located so as to advantageously be located near were a larger void volume in the intersection of two grooves occurs to minimize any water drainage restrictions.

As such as can easily be appreciated the TWI 20 as shown according to the present invention provides a continuous easily observable view of the TWI's 20. The TWI's 20 being of reduced depth are not abraded until the tread 2 starts to wear substantially. Once this occurs, the TWI's 20 may be abraded to a point where an indication that the tire should be removed is illustrated as described above. While the TWI 20 as shown is provided as a molded in feature integral to the tread 2, in some cases where mandated by local laws these TWI 20 may require the use of different colored materials so they are more readily visible. This feature as shown can be molded into the tire as well.

With reference to FIGS. 8 and 8A a blade 40 is shown. The blade 40 is an exemplary construction of the type of blade that can be made to form the tread wear indicator 20 according to the present invention. Each such blade 40 can be fitted into prepared openings in a tread forming mold (not illustrated) in the locations near an intersection of grooves as previously discussed. The exterior portion 41 has a hollow center portion extending inwardly. This exterior portion 41 forms the triangular outline 32. Small straight portions 45 form the short lines 35 to reflect the worn condition and only extends inwardly to the level of the full worn condition which starts at the top surface of the protruding exclamation point, shown as a cylindrical portion 42 and elongated straight portion 43 with oval ends 47, both portions 42, 43 project from a blade base surface 46 which forms the top surface of the tread wear indicator 20.

As shown the large hole 48 is used to help secure the blade 40 in the mold. The smaller hole 49 is a vent opening to allow entrapped air to escape during molding the tread 2. An important feature of the blade 40 is the straight portions 45 must be very short not extending beyond the thickness (t) of the exterior portion 41 much more than (x), (x) being 3 or 4 times the thickness (t), preferably less. This is so because these portions are underneath and buried in the tread rubber and must be pulled out without tearing the rubber. In this way the short lines 35 formed in the TWI 20 are hidden from sight until exposed by the worn out abrasion of the tread 2 lowering the exposed tread surface to this previously hidden feature. The exemplary blade 40 while shown as a single piece construction can be made using any number of pieces welded together to form the blade if so desired.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire tread for a radial passenger or light truck tire, the tread having a plurality of tread elements extending radially outwardly from a tread base to a radially outer surface, each tread element being defined by adjacent grooves, the tread comprising:

the adjacent grooves comprising a plurality of inclined grooves, the inclined grooves extend from a central region of the tread curving to laterally extending groove portions to the lateral edges of the tread, on each side of the tread the inclined grooves are connected to each other at the central region to form a circumferential groove;

a plurality of tread elements being elongated rib like structures, each having reduced chamfer at an end submerged between the intersection of two of the inclined grooves;

a continuous tread rib in the central region defined by two of the circumferential grooves formed by the inclined grooves, the continuous tread rib having reduced chamfer surfaces adjacent sides of the rib; and wherein a tread wear indicator is positioned in a large void volume on a reduced chamfer at the end of at least one of the elongated rib like structures and a tread wear indicator is positioned in a large void volume on a reduced chamfer surface of the tread rib; and wherein each tread wear indicator has a first molded geometric pattern at an outer surface and a second molded geometric pattern underlying the first molded pattern below the outer surface wherein the second geometric pattern when exposed indicates the tire should be removed.

2. The tire tread of claim 1 wherein the at least one of the elongated rib like structures has a chamfered groove wall extending radially inwardly to the tread wear indicator, the groove wall having a plurality of steps located at different depths.

3. The tire tread of claim 1 wherein the first geometric pattern is an outline of a triangular shape or symbol with an exclamation point inside the outline.

4. The tire tread of claim 3 wherein the second geometric pattern shows the outlined triangular shape with a plurality of short lines intersecting the outline indicating the tire should be removed as the tread is worn.

5. The tire tread for a radial passenger or light truck tire, the tread having a plurality of tread elements extending radially outwardly from a tread base to a radially outer surface, each tread element being defined by adjacent grooves of claim 1 wherein each tread wear indicator forms a substantially triangular shaped plateau.

6. The tire tread for a radial passenger or light truck tire, the tread having a plurality of tread elements extending radially outwardly from a tread base to a radially outer surface, each tread element being defined by adjacent grooves of claim 1 wherein a chamfer surface of the tread rib corresponds to and is aligned substantially adjacently with an opposite reduced chamfer volume at the end of one of the elongated rib like structures.

* * * * *